Sept. 29, 1953      J. R. PHANEUF      2,653,404
FISHING NET
Filed April 23, 1948      2 Sheets-Sheet 1
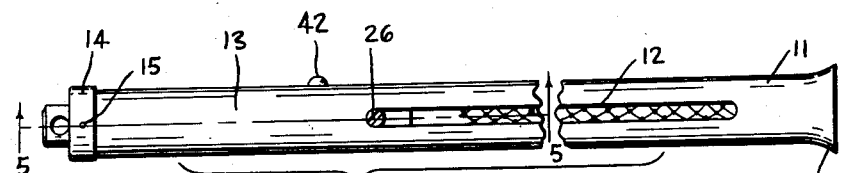
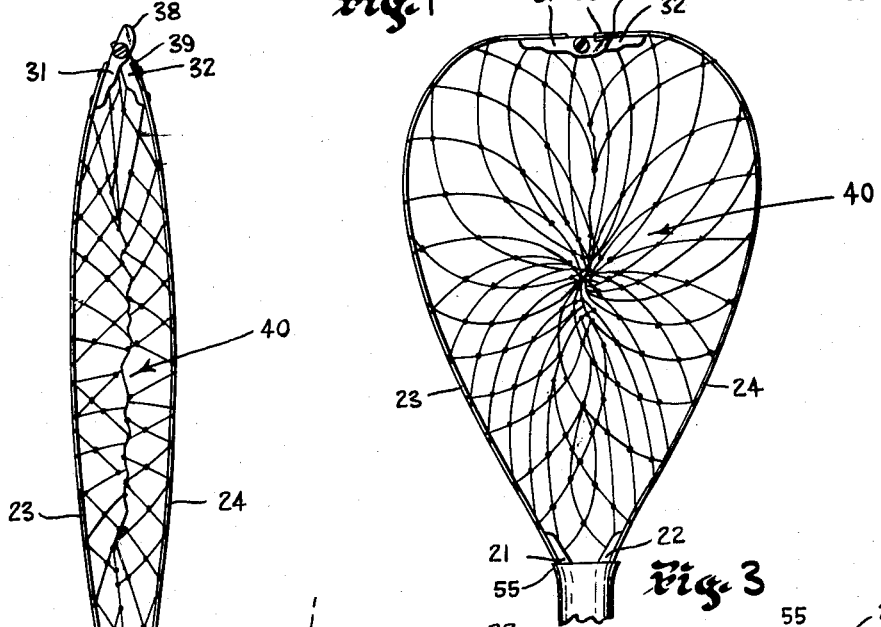
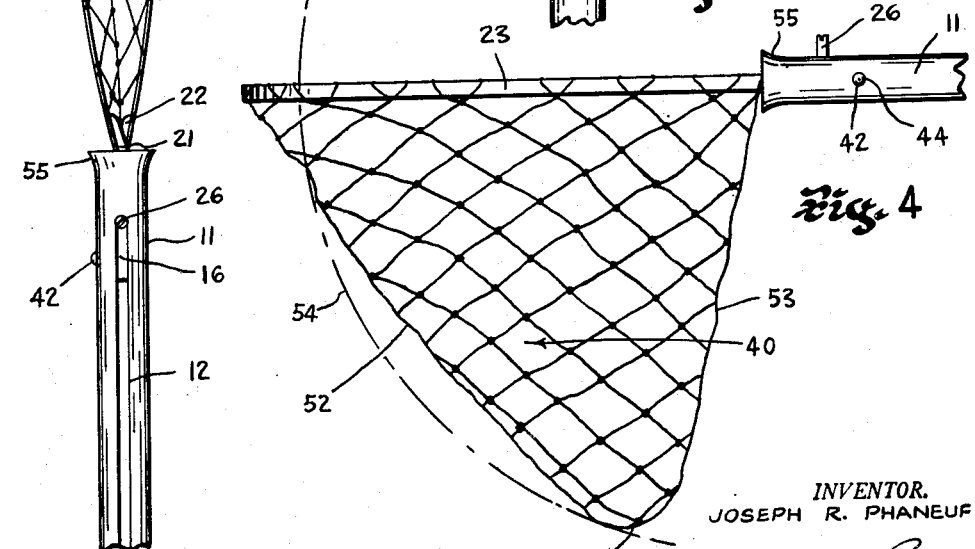
INVENTOR.
JOSEPH R. PHANEUF
BY Louis L. Gagnon
ATTORNEY Sept. 29, 1953      J. R. PHANEUF      2,653,404
FISHING NET
Filed April 23, 1948      2 Sheets-Sheet 2
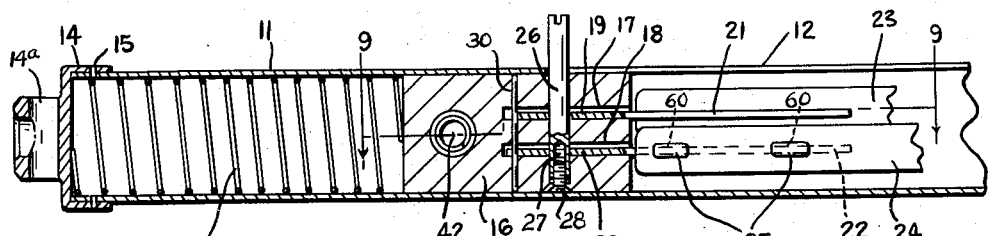
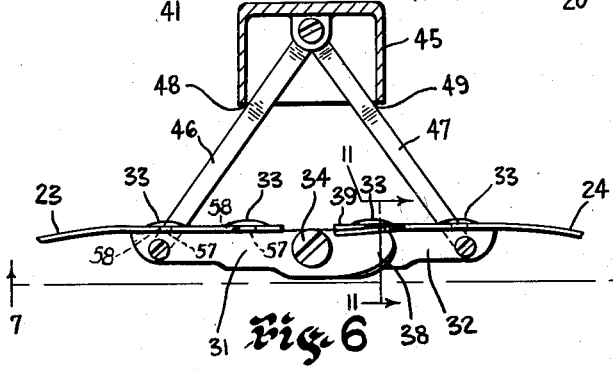
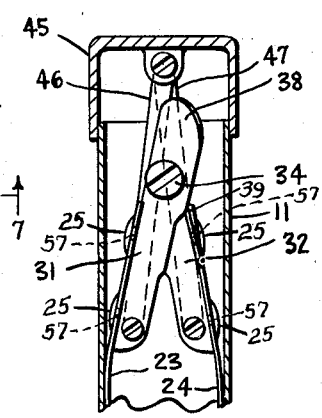
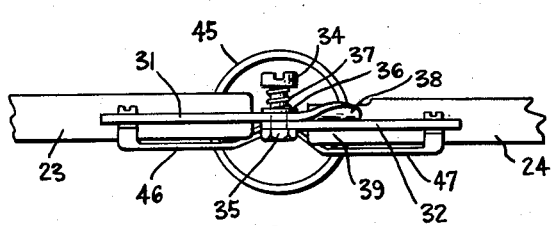
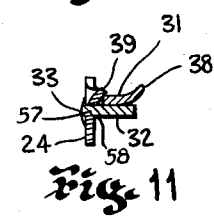
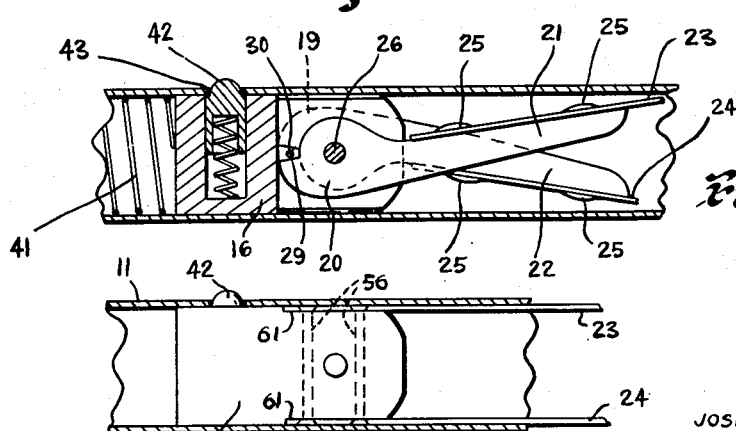
INVENTOR.
JOSEPH R. PHANEUF
BY
*Louis L. Gagnon*
ATTORNEY

Patented Sept. 29, 1953

2,653,404

UNITED STATES PATENT OFFICE 2,653,404

FISHING NET

Joseph R. Phaneuf, Southbridge, Mass.

Application April 23, 1948, Serial No. 22,923

4 Claims. (Cl. 43—12)

This invention relates to fishing nets and has particular reference to a collapsible landing net.

One of the principal objects of the invention is to provide a landing net embodying a hollow handle and collapsibly associated resilient net supporting frame portions and net which may be readily retracted as a unit to a position internally of the handle for ease of conveyance when not in use and which may be automatically ejected from the handle and quickly opened to a full position of use in a simple and efficient manner whereby the net supporting frame and handle will be locked against twisting or turning movement relative to each other.

Another object is to provide a landing net of the above character having resilient net supporting frame portions which may be quickly and easily ejected from a normally retracted position internally of the handle to a position externally thereof and to provide said frame portions with automatically functioning means for permanently retaining said frame portions in open position of use by simply exerting a slight pressure on the outer free ends of said frame portions.

Another object is to provide a landing net of the above character which is light in weight and well balanced when opened for use and which has ventilation means in the handle for permitting the net to dry after use and when said net is in retracted position within said handle.

Another object is to provide a hinge connection between the net supporting frame portions and a slide block located internally of the handle whereby the frame portions may be opened to fullest possible expansion without strain.

Another object is to provide a slide block of the above character which is self-lubricating and which will insure smooth and continued ease of operation.

Another object is to provide automatically functioning frame locking means for a device of the above character which will retain the frame portion in locked position internally or externally of the handle.

Another object is to provide a cap which may be automatically drawn to a position overlying the end of the handle when the net supporting frame portions and net are moved inwardly of the handle.

Another object is to provide a landing net of the above character which may be quickly and easily disassembled without the need of special tools.

Another object is to provide automatically and positive functioning means for retaining the resilient frame portions in opened position when in use and which may be simply and easily disengaged for allowing the frame portions to return to their initial set for ease of movement thereof internally of the handle when not in use.

Another object is to provide a net for a device of the above character which is so constructed as to afford ease of movement thereof to a position internally of the handle when the net supporting frame portions are drawn inwardly of said handle.

Other objects and advantages of the invention will become apparent from the following description taken in connection with the accompanying drawings and it will be apparent that many changes may be made in the details of construction and arrangement of parts shown and described without departing from the spirit of the invention as expressed in the accompanying claims. I, therefore, do not wish to be limited to the exact details of construction and arrangement of parts shown and described as the preferred forms only have been given by way of illustration.

Referring to the drawings:

Fig. 1 is a side elevational view of the device embodying the invention showing the parts in retracted position internally of the handle;

Fig. 2 is a fragmentary view of the device illustrated in Fig. 1 and showing the resilient net supporting frame portions in ejected position;

Fig. 3 is a plan view showing the net supporting frame portions of the device in open position of use;

Fig. 4 is a side elevational view of the device embodying the invention;

Fig. 5 is an enlarged fragmentary sectional view showing the internal construction of the device embodying the invention;

Fig. 6 is a fragmentary view showing the frame end of the device embodying the invention and illustrating a modification embodying a cap member;

Fig. 7 is an internal view of the frame end construction of the device illustrated in Fig. 6;

Fig. 8 is a fragmentary sectional view of the frame end construtcion of the device embodying the invention and showing the cap of Fig. 6 in assembled relation with the handle;

Fig. 9 is a fragmentary sectional view taken as on line 9—9 of Fig. 5;

Fig. 10 is a view generally similar to Fig. 9 of a further modified form of the invention; and Fig. 11 is a fragmentary sectional view taken on line 11—11 of Fig. 6.

Referring more particularly to the drawings wherein like characters of reference designate like parts throughout the several views, the device embodying the invention comprises a tubular handle 11, preferably formed of aluminum or other light weight metal, having a longitudinal slot 12 formed in a sidewall thereof and extending from adjacent a rear hand grip end portion 13 to adjacent the forward end of the handle. The rear end of the handle has a cap or closure portion 14 secured thereto by pins, screws or the like 15. The portion 14 is provided with a lug having an opening therein to which a cord may be attached.

Internally of the tubular handle 11, there is loosely supported a slide block 16 formed preferably of rock maple or other desirable hard wood impregnated with oil and wax to provide self-lubrication. The slide block 16, as shown in Figs. 5 and 9, has a pair of spaced parallel slots 17 and 18 formed in one end thereof in which is pivotally supported the hinge ears 19 and 20 of connection members 21 and 22. The connection members are secured to the inner ends of the spring net supporting frame portions 23 and 24 by spaced integral outwardly extending rectangular projections 59 formed on one of the sides of each of said members 21 and 22 and which are extended through spaced rectangular slots 60 formed in the frame portions and then headed over to anchor the parts together as illustrated at 25, see Figs. 5 and 8. The pivot pin to which the ears 19 and 20 are pivotally attached is illustrated at 26 in Fig. 5. The pin 26 is held in position through the provision of a threaded bore 27 in the inner end thereof and by threading said end onto a stud screw 28 internally of the block.

The hinge ears 19 and 20 are each provided with a shouldered portion 29 adapted to engage a pin 30 for limiting their inward pivotal movement.

The net supporting frame portions 23 and 24 are preferably formed of flat spring steel and are connected at their outer ends to connection means 31 and 32, said frame portions having integral projections 57 on the sides thereof which are shaped to extend through spaced slots 58 in said frame portions and are then headed over to anchor the parts together as illustrated at 33, see Figs. 6.

The connection means 31 and 32 are pivotally connected to each other by a pivot bolt 34. The bolt is held in position by a nut 35 and is provided with a washer 36 resiliently and frictionally held in position by a coil spring 37. The washer is located on the side of the connection means 31 and 32 opposite the nut 35 and is adapted to ride upwardly of the pivot bolt against the action of the coil spring 37 to allow the flared and slightly upturned end 38 formed on the connection means 31 to ride over and latch behind the slightly forwardly bent end 39 of the frame portion 24. This is to hold said frame portions 23 and 24 in open position as shown in Figs. 3, 6, and 7. This latching of the end 38 behind the forwardly bent end 39 of the frame portion 24 is accomplished by compressing the ends of the frame portions and in turn causing said frame portions to flex outwardly, as shown in Fig. 3, by an amount sufficient to allow the end 38 to snap over the forwardly bent end 39 and to be automatically latched therewith by the resilient action of the coil spring 37. To unlatch the end 38 from the end 39, all that is required is to exert a slight end pressure and simultaneous side pressure on said end portions. The unlatching will immediately allow the resilient side portions of the net supporting frame to straighten out due to their tendency to return to their initial set, as shown in Fig. 2.

The net carried by the frame portions 23 and 24 is diagrammatically illustrated at 40 and is adapted to be drawn inwardly of the tubular handle with said frame portions by engaging the outwardly protruding portion of the pivot pin 26 which extends through the longitudinal slot 12 and by pulling said pin rearwardly toward the hand grip portion 13. This simultaneously moves the slide block 16 rearwardly and into engagement with a coil spring 41 located internally of the tubular handle 11 and is adapted to compress said coil spring. The block 16 is provided on the side thereof, with a spring pressed trip button 42 adapted to latch with an opening 43 formed in the side wall of the tubular handle adjacent the hand grip portion 13 to hold the block 16, frame portions 23 and 24 and net 40 in retracted position internally of the tubular handle. It is particularly pointed out that the net 40 is so constructed that its lower end 51 lies rearwardly of its vertical center line, as shown in Fig. 4. This causes the front portion 52 of the net to extend rearwardly along a relatively sharp angle and the rear portion 53 to be inclined in a direction only slightly forwardly whereby said rear portion, during the drawing of the net inwardly of the handle, will cause the various forward portions of the net to move rearwardly and the end 51 to move upwardly substantially along an arcuate curve as illustrated by the dot and dash line 54. This positions the end 51 slightly rearwardly of the ends of the frame portions 23 and 24 whereby the net will be entirely drawn inwardly of the handle when the frame portions are drawn inwardly thereof. The end of the handle is preferably flared as illustrated at 55 to permit ease in drawing the net and frame portions internally of the handle. The entire unit is forced outwardly of the tubular handles by the coil spring 41 by merely compressing the trip button 42.

The button 42, when moved to the forward end of the tubular handle 11, is adapted to automatically latch with an opening 44 formed in the side wall of the tubular handle adjacent said forward end, see Fig. 4. This holds the frame portions 23 and 24 outwardly of the tubular handle and prevents rotation thereof relative to the handle when the frame portions are spread by latching the end 38 with the end 39.

A cap member 45, as shown in Figs. 6, 7 and 8, may be pivotally secured to the connection means 31 and 32 by link members 46 and 47 and may be automatically drawn over the outer end of the tubular handle 11, as shown in Fig. 8, when the frame portions 23 and 24 and the net 40 are drawn inwardly of the handle. In this instance, the handle has no flared end such as shown at 55.

The link members keep the cap 45 in alignment with the end of the tubular handle by bearing at their sides with the inner rim of the cap as shown at 48 and 49 in Fig. 6.

In Fig. 10, there is shown a slight modification wherein the resilient frame portions 23 and 24 are rigidly secured in diametrically opposed recesses 61 formed in the block 16 by rivets or the like 56.

It is particularly pointed out that the slot 12, although forming a guideway for the retracting pin 26, also provides a stop for limiting the outward movement of the net supports relative to the handle, prevents rotation of the net supports and net relative to the handle when open or retracted and also provides ventilation means whereby when a wet net is pulled into retracted position in the handle, it will be free to dry.

The parts may be quickly and easily disassembled by removing the pin 26.

The pivot bolt 34 is preferably threadedly connected to the member 32 and the nut 35 functions as a check nut to lock the bolt against backing out.

The flared end 55 is to prevent tearing the net when it is being moved to retracted position in the handle.

From the foregoing description, it will be seen that simple, efficient and economical means have been provided for accomplishing all of the objects and advantages of the invention.

Having described my invention, I claim:

1. In a fishing net of the type embodying a tubular handle and resilient net supporting frame portions operably connected with said tubular handle so as to be extendable and retractable with respect to said handle, the improvement wherein the outer ends of said frame portions have, adjacent each of said ends, connection means in the form of a plate member secured along a side edge thereof to each of the inner side surfaces of said frame portions, a pivot post pivotally connecting said plate members with each other at a location outwardly of the ends of said resilient frame portions, said pivot post being such that one of said plate members, in addition to its pivotal movement, is adapted to move in a sidewise direction relative to the other plate member in a direction longitudinally of the axis of the pivot post, and resilient means on said pivot post for normally urging said plate members towards each other, one of said frame portions having an end portion angularly disposed with respect to the plate member secured thereto, and the plate member secured to the other of said frame portions, beyond the pivot post, having an end portion deflected outwardly in a sidewise direction and, under the tension of the resilient means on said pivot post, being adapted to automatically latch with said angularly disposed portion of the end of the opposed frame portion when the adjacent ends of said resilient net supporting frame portions are pressed inwardly toward the tubular handle to bow said frame portions outwardly a desired amount with respect to each other and to hold said frame portions in said bowed relation, the resiliency of said frame portions, when the deflected end portion of the plate member is in unlatched relation with the angularly disposed end of the opposed frame portion, being such as to tend to cause said frame portions to return to their initial extended shape whereby they may be retracted and extended with respect to the tubular handle.

2. In a fishing net of the type embodying a tubular handle and resilient net supporting frame portions operably connected with said tubular handle so as to be extendable and retractable with respect to said handle, the improvement wherein the outer ends of said frame portions have, adjacent each of said ends, connection means in the form of a plate member secured along a side edge thereof to each of the inner side surfaces of said frame portions, a pivot post pivotally connecting said plate members with each other at a location outwardly of the ends of said resilient frame portions, said pivot post being such that one of said plate members, in addition to its pivotal movement, is adapted to move in a sidewise direction relative to the other plate member in a direction longitudinally of the axis of the pivot post, and resilient means on said pivot post for normally urging said plate members towards each other, one of said frame portions having an end portion angularly disposed with respect to the plate member secured thereto, and the plate member secured to the other of said frame portions, beyond the pivot post, having an end portion deflected outwardly in a sidewise direction and, under the tension of the resilient means on said pivot post, being adapted to automatically latch with said angularly disposed portion of the end of the opposed frame portion when the adjacent ends of said resilient net supporting frame portions are pressed inwardly toward the tubular handle to bow said frame portions outwardly a desired amount with respect to each other and to hold said frame portions in said bowed relation, the resiliency of said frame portions, when the deflected end portion of the plate member is in unlatched relation with the angularly disposed end of the opposed frame portion, being such as to tend to cause said frame portions to return to their initial extended shape whereby they may be retracted and extended with respect to the tubular handle, a hollow cap shaped to fit over the end of the tubular handle when the frame portions are in retracted position and a pair of link members pivotally connected adjacent one end thereof to the cap and adjacent their respective opposed ends to each of the respective plate members.

3. In a fishing net of the type embodying a tubular handle and relatively long blade springlike resilient net supporting frame portions operably connected with said tubular handle so as to be extendable and retractable with respect to said handle, the improvement wherein the outer ends of said frame portions have, adjacent each of said ends, connection means in the form of a plate member secured along a side edge thereof to each of the inner side surfaces of said frame portions, a pivot post pivotally connecting said plate members with each other at a location outwardly of the ends of said resilient frame portions, said pivot post being such that one of said plate members, in addition to its pivotal movement, is adapted to move in a sidewise direction relative to the other plate member in a direction longitudinally of the axis of the pivot post, and coil spring means on said pivot post for normally urging said plate member towards each other, one of said frame portions having an end portion angularly disposed with respect to the plate member secured thereto, and the plate member secured to the other of said frame portions, having an end extending outwardly beyond the pivot and being deflected outwardly in a sidewise direction and, under the tension of the coil spring means on the post, being adapted to automatically latch with said angularly disposed portion of the end of the opposed frame portion when the adjacent ends of said resilient net supporting frame portions are pressed inwardly toward the tubular handle to bow said frame portions outwardly a desired amount with respect to each other and to hold said frame portions in said bowed relation, the resiliency of said frame portions, when the deflected end portion of the plate member is in unlatched relation with the angularly disposed end of the opposed frame portion, being such as to tend to cause said frame portions to return to their initial extended shape whereby they may be retracted or extended with respect to the tubular handle.

4. In a fishing net of the type embodying a tubular handle and relatively long blade spring-like resilient net supporting frame portions operably connected with said tubular handle so as to be extendable and retractable with respect to said handle, the improvement wherein the outer ends of said frame portions have, adjacent each of said ends, connection means in the form of a plate member secured along a side edge thereof to each of the inner side surfaces of said frame portions, a pivot post pivotally connecting said plate members with each other at a location outwardly of the ends of said resilient frame portions, said pivot post being such that one of said plate members, in addition to its pivotal movement, is adapted to move in a sidewise direction relative to the other plate member in a direction longitudinally of the axis of the pivot post, and coil spring means on said pivot post for normally urging said plate members towards each other, one of said frame portions having an end portion angularly disposed with respect to the plate member secured thereto, and the plate member secured to the other of said frame portions, having an end extending outwardly beyond the pivot and being deflected outwardly in a sidewise direction and, under the tension of the coil spring means on the post, being adapted to automatically latch with said angularly disposed portion of the end of the opposed frame portion when the adjacent ends of said resilient net supporting frame portions are pressed inwardly toward the tubular handle to bow said frame portions outwardly a desired amount with respect to each other and to hold said frame portions in said bowed relation, the resiliency of said frame portions, when the deflected end portion of the plate member is in unlatched relation with the angularly disposed end of the opposed frame portion, being such as to tend to cause said frame portions to return to their initial extended shape whereby they may be retracted or extended with respect to the tubular handle, a hollow cap shaped to fit over the end of the tubular handle when the frame portions are in retracted position and a pair of link members pivotally connected adjacent one end thereof to the cap and adjacent their respective opposed ends to each of the respective plate members.

JOSEPH R. PHANEUF.

References Cited in the file of this patent

UNITED STATES PATENTS

| Number | Name | Date |
|---|---|---|
| 325,287 | Utley | Sept. 1, 1885 |
| 412,773 | Meisselbach | Oct. 15, 1889 |
| 440,568 | Hebard | Nov. 11, 1890 |
| 985,114 | Covell | Feb. 21, 1911 |
| 1,077,481 | Levy | Nov. 4, 1913 |
| 1,094,886 | Diossy | Apr. 28, 1914 |
| 1,598,323 | Spencer | Aug. 31, 1926 |
| 1,772,565 | McKone | Aug. 12, 1930 |
| 2,064,839 | Kroll et al. | Dec. 22, 1936 |
| 2,561,645 | Bedford et al. | July 24, 1951 |

FOREIGN PATENTS

| Number | Country | Date |
|---|---|---|
| 639,737 | France | Jan. 28, 1927 |